H. MOTT.
Churn.
No. 54,583.
Patented May 8, 1866.
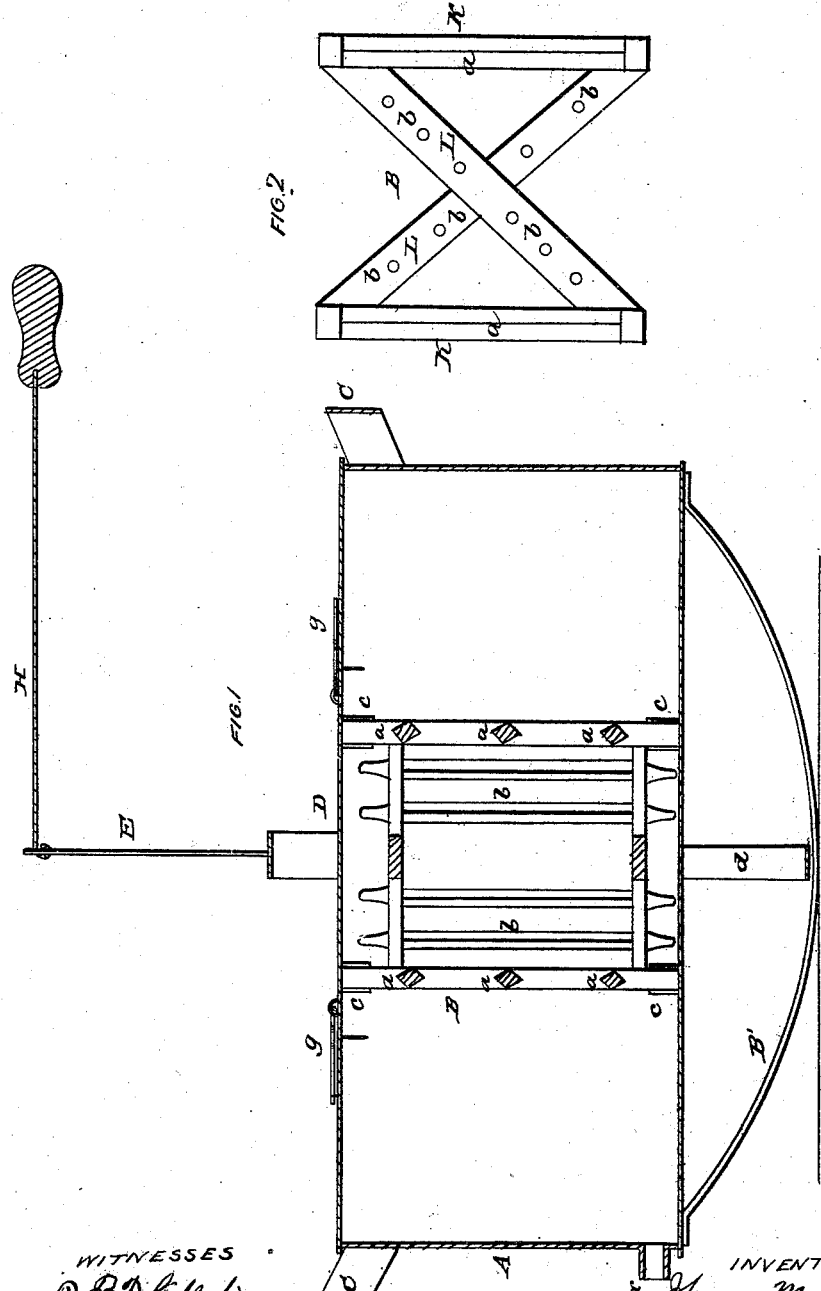
WITNESSES
INVENTOR

UNITED STATES PATENT OFFICE.

HORACE MOTT, OF BELLEVUE, MICHIGAN.

IMPROVEMENT IN CHURNS.

Specification forming part of Letters Patent No. 54,583, dated May 8, 1866.

*To all whom it may concern:*

Be it known that I, HORACE MOTT, of Bellevue, in the county of Eaton and State of Michigan, have invented certain new and useful Improvements in Churns; and I do hereby declare that the following is a full, clear, and exact description of the same, reference being had to the accompanying drawings and the letters of reference marked thereon.

Figure 1 is a longitudinal vertical section of the churn. Fig. 2 is a plan view of the churn-dasher.

In the drawings hereto annexed, and forming a part of this specification, A represents the churn-box, which is made of wood or metal, and shaped oblong, as shown in Fig. 1. At the bottom of the churn are two rockers, B′, which extend from end to end of said churn.

B represents the churn-dasher, which is stationary and is placed in the center of the churn A. This dasher is composed of four distinct parts, K K and L L, Fig. 2. The pieces K K extend horizontally across the churn and are held secure by the brackets c, which are secured to the sides of the churn-box A. Each of the gates K K and L L are composed of a series of slats or rails, a and b. The gates L L are placed between the gates K K, and cross each other at their centers, forming an X, as shown in Fig. 2.

The dasher B can be extracted from the churn-box A whenever it is necessary to cleanse it, or for other purposes.

Directly above the top of the dasher B is a lid, D, which is provided with a suitable handle, and is attached to the churn-box by the hooks g g.

E represents a wire, which is secured to each side of the churn-box by means of loops, and extends a short distance above said churn-box. This wire forms a semicircle above the churn, attached to which is the handle H, that works the churn to and fro upon its rockers.

The wire E, with handle H, can be taken from the churn by merely withdrawing the same from the loops in the sides of the churn-box.

The churn-box is also provided with handles C C, stationed at each end, to work the churn upon its rockers, in lieu of the handle H and wire E.

At the bottom of the churn, at one end, is a spout, x, to run the water or milk from the churn.

d is a stay to hold the center of the rockers B′ more firm to the churn-box A.

It will be seen by the drawings hereto annexed that the rails composing the dasher are placed in the sections K and L, so that the edges of the same face the vacuum where the milk is placed to be churned, so that the cream will be more effectually churned to butter.

The working of this churn is performed by some person rocking the churn-box, wherein the milk is placed, by the handle H or by the handles C C.

After churning, the dasher can be taken out of the churn-box, as before described, to wash it, and the buttermilk will run out of the spout x.

The dasher B can be made of four separate sections, or can be attached so as to form one piece.

Having thus fully described my invention, what I claim as new, and desire to secure by Letters Patent, is—

The rocking churn-box, the sliding dasher-gates, and the handles, arranged and used as and for the purpose specified.

HORACE MOTT.

Witnesses:
N. S. BOOTH,
ALFRED MOTT.